L. HULL.
Gasalier Extensions.
No. 143,765. Patented Oct. 21, 1873.
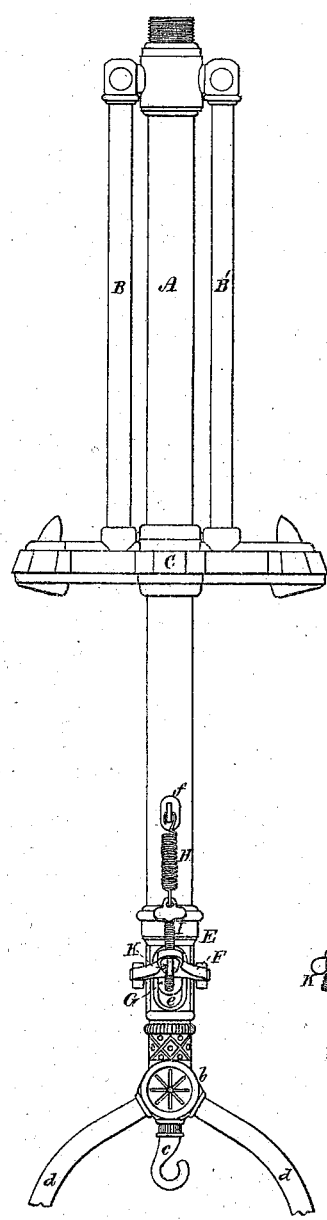
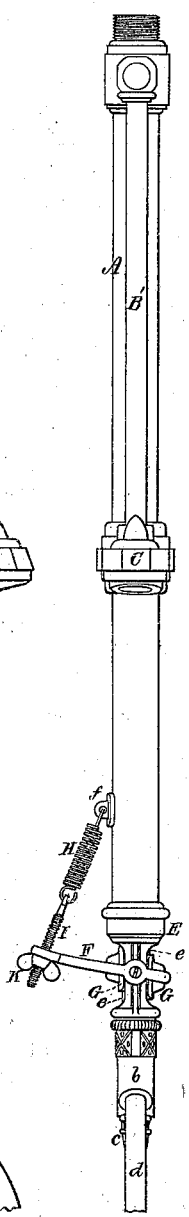
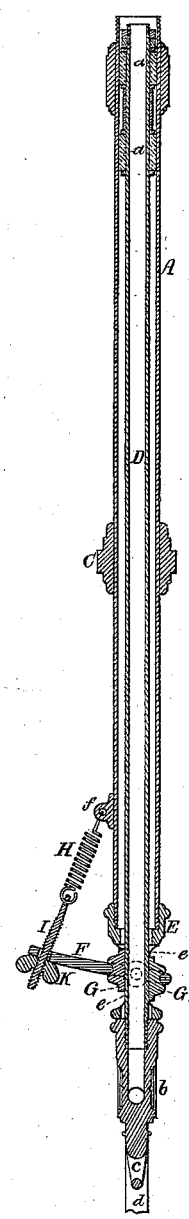
Witnesses
Liverus Hull.
by his attorney

UNITED STATES PATENT OFFICE.

LIVERUS HULL, OF CHARLESTOWN, MASSACHUSETTS.

IMPROVEMENT IN GASALIER-EXTENSIONS.

Specification forming part of Letters Patent No. 143,765, dated October 21, 1873; application filed August 18, 1873.

*To all whom it may concern:*

Be it known that I, LIVERUS HULL, of Charlestown, of the county of Middlesex and State of Massachusetts, have invented a new and useful Improvement in Gasalier-Extensions; and do hereby declare the same to be fully described in the following specification and represented in the accompanying drawings, of which—

Figure 1 is a front elevation, Fig. 2 a side view, and Fig. 3 a vertical section, of a gasalier-extension provided with my invention.

In such drawings, A denotes the leading conduit, provided at its upper part with two parallel branch pipes, B B', to convey gas into a tubular cross-head, C, fixed or arranged on the conduit A, in manner as represented. The conduits to the main burners are to project from the cross-head C. Within the main conduit A is a long secondary conduit or pipe, D, constituting part of the extension, such pipe D, at or near its upper end, being, like the piston of a steam-engine, provided with a packing, *a a*, to enable it to slide with a gas-tight joint up or down within the tube A. The foot *b* of the pipe D is furnished with a hook, *c*, and two branch pipes, *d d*, one of the latter opening out of or communicating with the pipe D. To the lower end of the pipe A, and encompassing the pipe D, is fixed a tubular foot, E, having slots *e e* in its opposite sides. A lever, F, encompasses the foot E, is pivoted to it, and carries two friction-brakes or jaws, G G, which, arranged in the two slots *e e*, bear against opposite sides of the tube D. A helical spring, H, has one end attached to the tube A, or an ear, *f*, projecting therefrom, and the other to a male screw, I, which goes through the longer arm of the brake-lever, a nut, K, being screwed upon the screw and against the arm, all being as shown. One brake only may be used with the lever, but I prefer two, arranged as set forth.

By screwing up the nut the pressure of the brake or brakes on the tube D may be increased, in order to obtain sufficient friction to support the tube D and its adjuncts at any suitable elevation within the range of its motion within the tube A.

It will be seen that by applying the packing to the upper part of the tube D so that such packing may move with such tube within the tube A, and, by arranging the adjustable friction apparatus in connection with the tube A at its lower part, the tube D is kept free from grease or the lubricating matter which, from the packing, will gather on the inner surface of the tube A.

In such gasalier-extensions as have the packing of the auxiliary tube at the lower end of the main tube the oil or grease will get upon the auxiliary tube, and deface it, and will be seen while the said tube is drawn down. Furthermore, when so oiled, the inner tube becomes attractive to flies or insects, and soon gathers dirt or dust, which, while the tube may be in the act of being forced upward, is liable to cut through the packing, and thereby causes leakage of gas to follow; but, by having the packing arranged at the upper part of the inner tube so as to be movable therewith, also by having the adjustable friction apparatus arranged with the two tubes in manner, and supported by the outer one, as set forth, the tube D will always be free from oil or grease, and thus there will be no chance of such injury to the packing as above mentioned.

I do not claim a movable drop-light tube, a stationary conduit, and a friction apparatus, constructed and arranged within another tube in manner as shown in either of the United States Patents 105,435, 126,241, as with my arrangement of the packing and friction apparatus but one stationary tube becomes necessary with the drop or movable tube; nor do I herein claim a friction apparatus shown in an application for a patent recently made by me, and allowed, for an extension-chandelier.

My present friction apparatus, though having, like the other, a clamp-lever and a spring, has what the other does not possess, viz., the screw-rod I and the nut K, whereby the tension of the spring or its draft on the lever may be regulated, or increased or diminished, from time to time, as occasion may require; therefore,

I claim as my invention—

The adjustable friction apparatus, substantially as described, consisting of the lever F, one or two jaws, G G, the spring H, screw I, and nut K, all combined and arranged as set forth.

LIVERUS HULL.

Witnesses:
R. H. EDDY,
J. R. SNOW.